(12) United States Patent  
Hsu et al.

(10) Patent No.: US 7,083,285 B2  
(45) Date of Patent: Aug. 1, 2006

(54) COOLING STRUCTURE FOR PROJECTION APPARATUS

(75) Inventors: Nien-Hui Hsu, Miao-Li (TW); Guo-Ching Chang, Miao-Li (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 10/709,712

(22) Filed: May 24, 2004

(65) Prior Publication Data

US 2004/0252282 A1     Dec. 16, 2004

(30) Foreign Application Priority Data

Jun. 13, 2003  (TW) .............................. 92210943 U

(51) Int. Cl.
| | |
|---|---|
| G03B 21/16 | (2006.01) |
| G03B 21/14 | (2006.01) |
| G03B 21/18 | (2006.01) |
| G03B 21/22 | (2006.01) |
| G03B 21/26 | (2006.01) |
| H04N 5/74 | (2006.01) |
| G02F 1/1333 | (2006.01) |

(52) U.S. Cl. ............................ 353/61; 353/57; 353/60; 353/119; 348/748; 349/161

(58) Field of Classification Search ................ 353/61, 353/52, 57, 58, 60, 119, 122; 348/148; 349/161
See application file for complete search history.

(56) References Cited

U.S. PATENT DOCUMENTS

| | | | | |
|---|---|---|---|---|
| 6,398,366 | B1 * | 6/2002 | Hara et al. ..................... | 353/57 |
| 6,443,575 | B1 * | 9/2002 | Miyamoto et al. ............ | 353/58 |
| 2002/0163627 | A1 * | 11/2002 | Ohishi et al. ................. | 353/58 |
| 2003/0179579 | A1 * | 9/2003 | Hsu et al. ..................... | 362/294 |
| 2003/0189694 | A1 * | 10/2003 | Yamada et al. ............... | 353/77 |

* cited by examiner

*Primary Examiner*—W.B. Perkey  
*Assistant Examiner*—Rochelle Blackman  
(74) *Attorney, Agent, or Firm*—Winston Hsu

(57) ABSTRACT

A partition installed in a housing of a projection apparatus to form a double-layer structure of a first zone and a second zone is used for a component of a cooling structure for the projection apparatus. Moreover, a first air inlet is disposed at the lower part of the first zone and a second air inlet is disposed between the first and the second zones. An air outlet with a duct and a plurality of sound sources and heat elements are disposed in the second zone. Outside air is drawn in from the first air inlet through a fan, then turned to enter the second zone through the second air inlet to cool heat elements and finally exhausted out of the system from the air outlet through the duct. Besides, the installments of the partition and the duct allow the distance of the sound source broadcasting to be lengthened and the diffusion light to be blocked so that both the noise and the leaking of the diffusion light can be reduced effectively.

8 Claims, 6 Drawing Sheets

COOLING STRUCTURE FOR PROJECTION APPARATUS

BACKGROUND OF INVENTION

1. Field of the Invention

The present invention relates to a projection apparatus, and more particularly to a cooling structure applied to a projection apparatus.

2. Description of the Prior Art

Please refer to FIGS. 1A and 1B. An air inlet 111 and air outlet 112 of a conventional cooling structure are respectively installed on the relative side covers of a housing 12 of a projection apparatus 10, and a first fan 113 is installed between the air inlet 111 and the air outlet 112 and a second fan 114 is installed at the air inletting end of the air outlet 112. Cooling wind is directly drawn from the air inlet 111 through the first fan 113 into the housing 12 to cool a power supply 13 and guided to cool a lamp 14. Finally, the cooling wind is exhausted out of the housing 12 through the second fan 114 so as to attain to the cooling of the system.

The air inlet 111, the air outlet 112, the fans 113 and 114 and the optical engine 15 in the cooling structure mentioned above are all installed in the same space, and no partition is installed to block noise and diffusion light so that sounds yielded from the rotations of the fans 113 and 114 and the optical engine are easy to be broadcasted out of the housing 12 through the air inlet 111 and the air outlet 112 to form the noise which influence the audio enjoyment. Besides, the diffusion light yielded from the optical engine 15 directly passes through or is indirectly reflected through the air inlet 111 and the air outlet 112 to leak out of the system.

SUMMARY OF INVENTION

One object of the present invention is to provide a cooling structure for a projection apparatus, forming a double-layer air inletting structure by installing a partition in a housing to reduce the strength of a sound source effectively so as to attain to the noise reduction of a system.

Another object of the present invention is to provide a cooling structure for a projection apparatus, preventing the diffusion light in the apparatus from being leaked by installing a partition and an air duct.

Still another object of the present invention is to provide a cooling structure for a projection apparatus, cooling the projection apparatus effectively by disposing an air duct properly.

Still another object of the present invention is to provide a cooling structure for a projection apparatus, utilizing a single first air inlet and installing it at the bottom of a housing; and installing a filter net at the first air inlet to prevent air inletting from the flank sides of the housing so as to reduce the accumulation of dust effectively.

For attaining to the objects mentioned above, a partition installed in a housing of a projection apparatus to form a double-layer structure of a first zone and a second zone is used for a component of a cooling structure in the projection apparatus. Besides, a first air inlet is disposed at the lower part of the first zone and a second air inlet is disposed between the first and the second zones. An air outlet with a duct and a plurality of sound sources and heat elements is disposed in the second zone. Outside air is drawn in from the first air inlet through a fan, then turned to enter the second zone through the second air inlet to cool heat elements and finally exhausted out of the system from the air outlet through the duct. Moreover, the installments of the partition and the duct allow the distance of the sound source broadcasting to be lengthened and the diffusion light to be blocked so that both the noise and the leaking of the diffusion light can be reduced effectively.

BRIEF DESCRIPTION OF DRAWINGS

The present invention can be more fully understood by reference to the following description and accompanying drawings, in which.

DETAILED DESCRIPTION

Figure 1A:
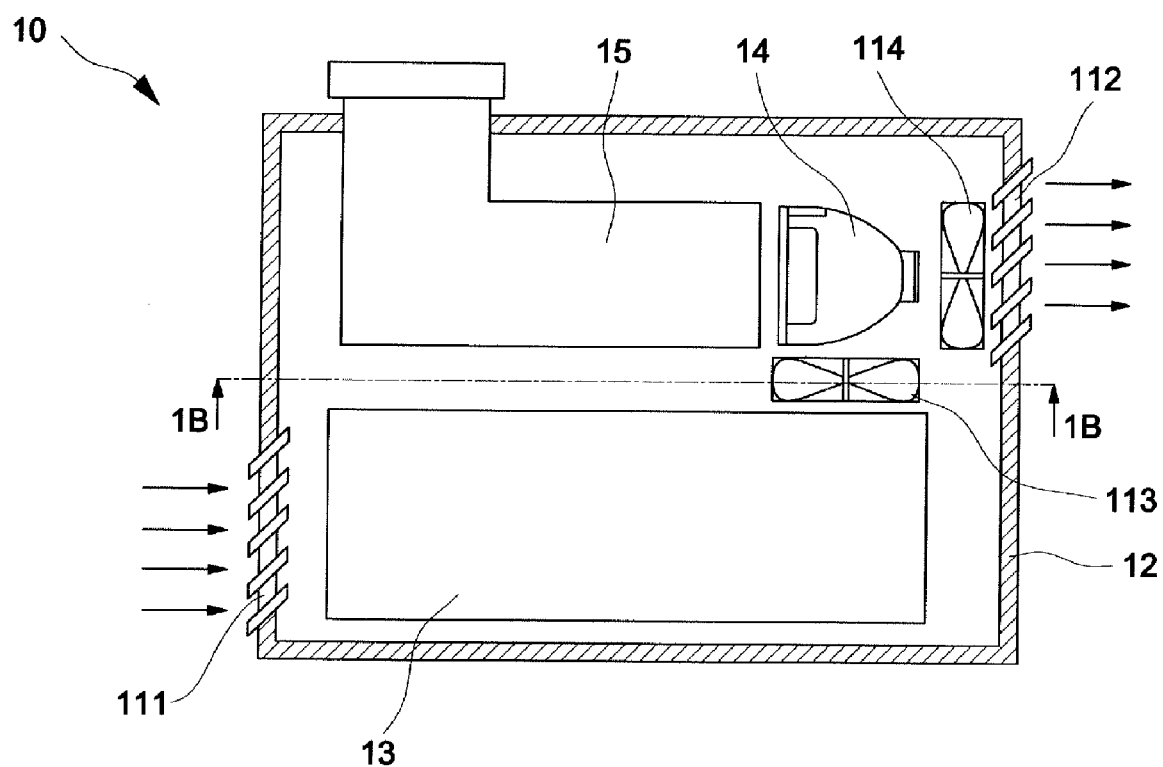
FIG. 1A is a vertical view, showing a cooling structure in a projection apparatus of the prior art.
Figure 1B:
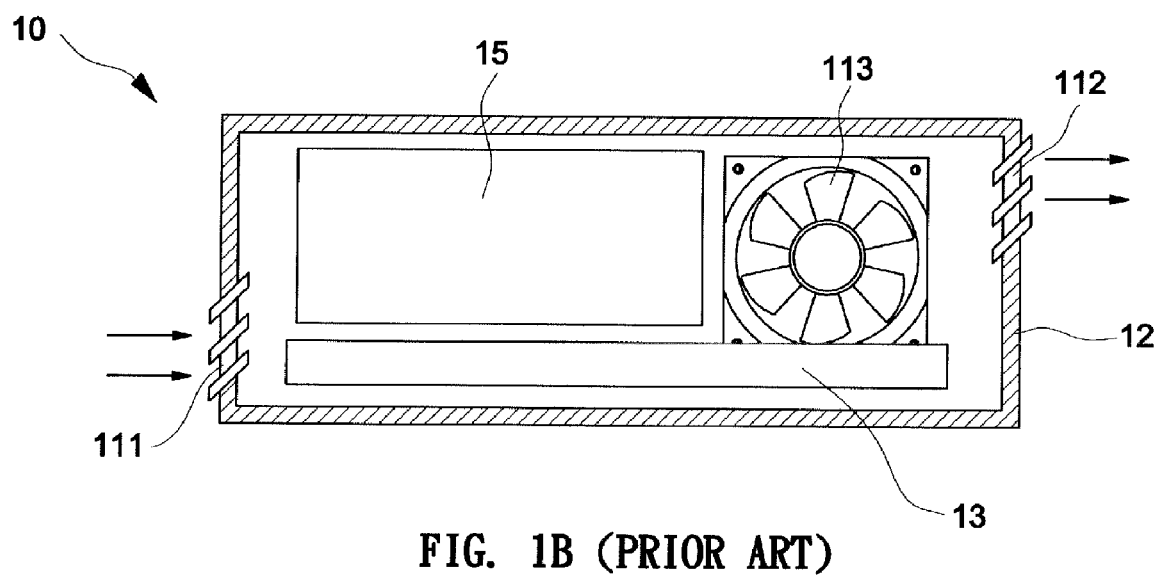
FIG. 1B is a side view, showing a cooling structure in a projection apparatus of the prior art.
Figure 2:
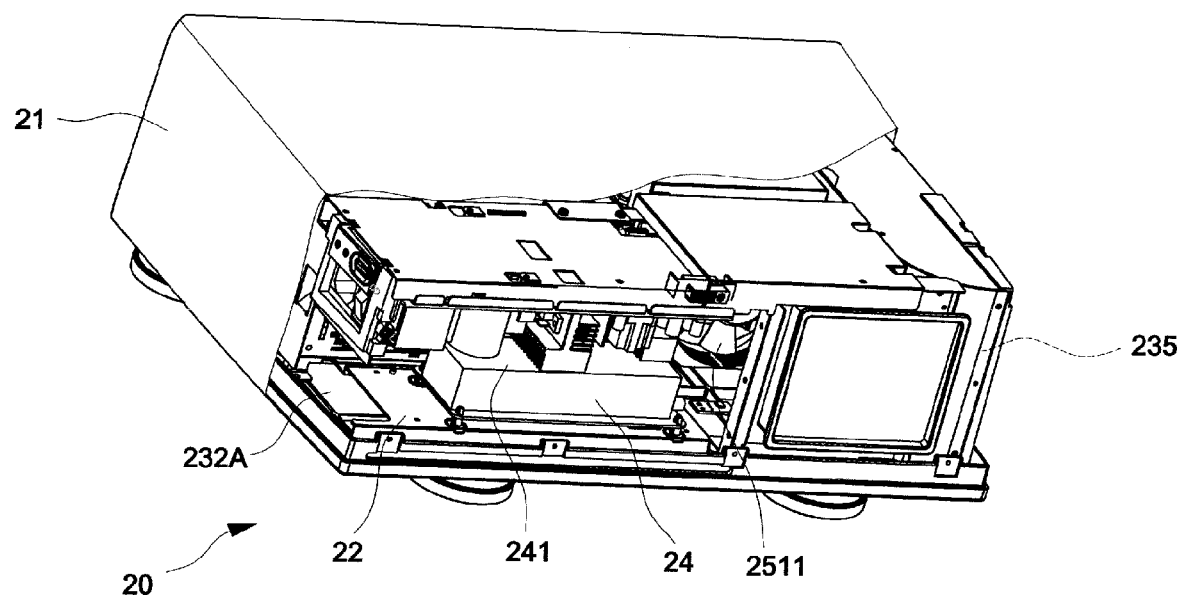
FIG. 2 is a perspective view, showing a projection apparatus according to the present invention.
Figure 3:
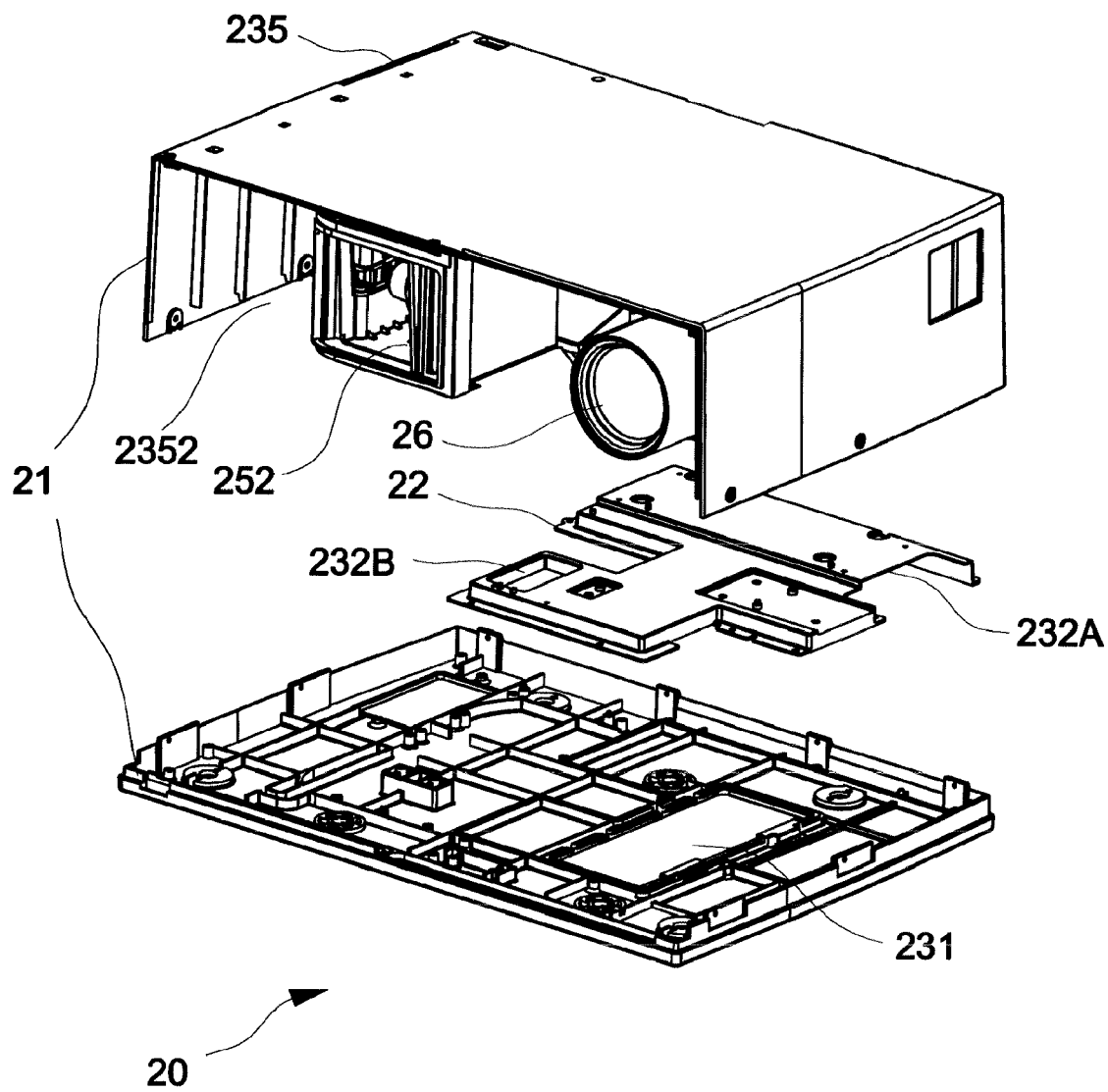
FIG. 3 is an explosive view, showing a projection apparatus according to the present invention.
Figure 4:
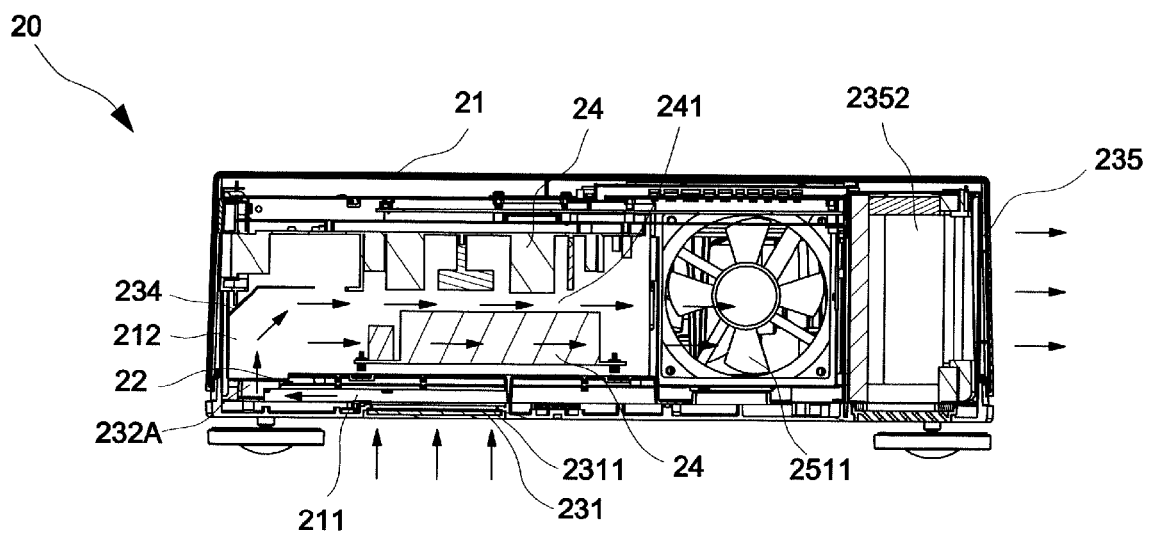
FIG. 4 is a side cross-sectional view, showing a projection apparatus according to the present invention.

Please refer to FIGS. 2, 3 and 4. A projection apparatus 20 according to the present invention mainly comprises a housing 21 and a partition 22, in which the partition 22 is disposed transversely in the housing 21 for forming a double-layer structure of a first zone 211 and second zone 212 therein. Besides, a first air inlet 231 communicated with outside is disposed at the lower part of the first zone 211. In addition, a filter 2331 is installed at the first air inlet 231 for filtering dust entered into the housing 21. Second air inlets 232A and 232B for communicating the first zone 211 and the second zone 212 are disposed on the partition 22 and a turning angle exists between the first air inlet 231 and the second air inlets 232A and 232B. A guide plate 234 is installed at the exit of the second air inlet 232A for preventing the output air from being blown close to the wall of the housing 21 to allow the output air to be guided to turn automatically to be blown through the elements needed to cool, such as a low voltage power supply (LVPS).

Figure 5:
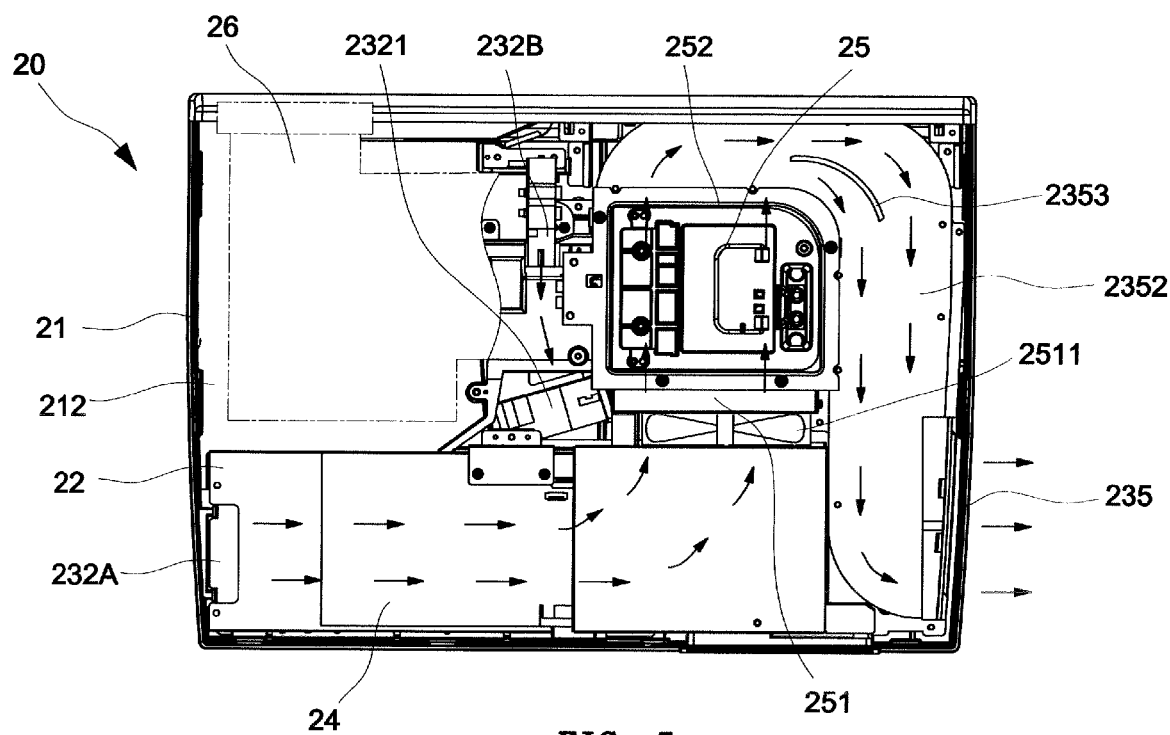
FIG. 5 is an upward cross-sectional view, showing a projection apparatus according to the present invention.

Please refer to FIG. 5. A blower 2321 is installed at the exit of the second air inlet 232B for guiding the airflow to cool the inside part of a lamp 25. An air outlet 235 is installed at the second zone 212 for guiding the airflow out of the housing 21. In addition, a plurality of heat elements and sound sources are installed the second zone 212, such as printing circuit boards (PCB) 24 (e.g. ballast, LVPS and optical engine driving circuit boards), a light bulb 25 and optical engine 26, in which power elements (e.g. resistors, capacitors and diodes) in the PCBs 24 are disposed face to face and a duct 241 is formed among them. The entrance of the duct 241 is located in the vicinity of the second air inlet 232A and the light bulb 25 is installed at the exit thereof. An air entrance 251 and an air exit 252 are disposed in the light bulb 25; the air entrance 251 is connected to the exit of the duct 241 and a fan 2511 is installed in front thereof for guiding the air flow to cool the outside of the light bulb 25. And the air exit 252 of the light bulb 25 is connected to an air-guiding duct 2352 while the other end of the air-guiding duct 2352 is connected to the air outlet 235. A curved air-flowing path in the air-guiding duct 232 can be used to decay the sound strength to lower the noise transmitted out of the housing 21. Besides, a baffle 2353 is installed at the turning point of the air-guiding duct 2352 to allow the air flowing smoothly at the turning point of the air-guiding duct 2352 so as to increase the amount of the airflow.

When the fans 2511 and 2321 are driven, outside air is drawn in from the first air inlet 231 at the first zone 211 disposed at the lower layer of the housing 21; part of the air is sucked through the fan 2511 to enter the second zone 22 disposed at the upper layer of the housing 21 through the second air inlet 232A after passing through the turning point. Then, the airflow is guided toward the duct 241 formed by the PCBs 24 through the guide plate 234 to cool the power elements on the PCBs 24. There-after, the airflow is entered the outside of the light bulb 25 to process the cooling. Besides, part of the air is sucked by the fan 2321 to enter the inside part of the light bulb 25 through the second air inlet 232B to process the cooling. Finally, the air passes through the air-guiding duct 2322 to be exhausted through the air outlet 235 so as to attain to the cooling of the whole projection apparatus.

That the double layers of the air inletting structure is form by installing the partition 22 in the housing 21 in the projection apparatus 20 and the sound sources (e.g. the optical engine 26, the fans 2321 and 2511) is installed in the second zone 212 according to the present invention can allow the first air inlet 231 used to communicate with the outside of the housing to be disposed in a different space from the sound sources, so that the strength of the sound can be decayed, the sound source is blocked by the partition 22 and the transmission distance of the noise is increased. Moreover, when the sound in the second zone 212 passes through the second air inlets 232A and 232B, it is effected by the partition 22 to cause the high frequency components thereof, which are over a certain frequency, not to be able to be transmitted continuously through diffraction so that the sound energy is decayed and the sound strength is lowered.

Besides, the turning angle is existed among the first and the second air inlets 232A and 232B, the air-guiding duct 2352 with the curved path is disposed before the air outlet 235 and a proper sound absorption material is attached inside of the air-guiding duct 2352 depending on the sound frequencies to cause the distance for transmitting the sound to the outside to be lengthened so that the sound strength is lowered. Therefore, the projection apparatus according to the present invention can decay the sound strength effectively to attain to the benefit of the reduction of the system noise. In addition, the noise can be lowered below 28 dB for a system under a normal operation according to the present invention.

Moreover, the single first air inlet 231 according to the present invention is used to draw outside air into the housing and disposed at the lower side of the projection apparatus with the filter 2311; this can not only prevent dust from stacking but also allow the filter to be replaced conveniently and keep the housing artistic. Besides, because the first air inlet communicated with the outside is blocked by the partition 22 so that the diffraction light yielded from the optical engine 26 in the second zone 212 can be prevented from being leaked out of the system. Moreover, the air-guiding duct 2352 with the curved path installed before the air outlet 235 can also be utilized to block the leaking of the diffraction light. Therefore, the light-leaking problem can be solved effectively through the installments of the partition 22 and the air-guiding duct 2352.

It is noted that the cooling structure for a projection apparatus described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A projection apparatus, comprising:
    a housing having a first air inlet and an air outlet, the first air inlet positioned at a bottom surface of the housing, and a space formed between the bottom surface and a surface positioning the projection apparatus, the air outlet positioned at a side surface of the housing;
    a partition installed horizontally inside said housing for separating the housing into a first zone and a second zone, the first air inlet being formed at the first zone and positioned under the partition, the air outlet being formed at the second zone;
    a second air inlet formed between the partition and the housing;
    an optical engine positioned inside the second zone;
    a light source positioned inside the second zone for emitting light into the optical engine to form an image; and
    a fan installed in the second zone for drawing air from the first air inlet and second air inlet into the second zone, the air being exhausted through the air outlet;
    wherein the partition has a a periphery, a part of the periphery connected to the bottom surface of the housing and the other part of the periphery forming the second air inlet with the housing.

2. The projection apparatus according to claim 1, wherein a guide plate is installed at the exit of said second air inlet to guide the air to elements needed to be cooled.

3. The projection apparatus according to claim 1, further comprising an air-guiding duct having one end connected to said air outlet.

4. The projection apparatus according to claim 3, wherein the air-guiding duct has a curved air flowing path.

5. The projection apparatus according to claim 4, further comprising a baffle installed inside said air-guiding duct.

6. The projection apparatus according to claim 1, further comprising a plurality of printing circuit boards forming a duct having one end close to said second air inlet.

7. The projection apparatus according to claim 1, further comprising a filter installed at said first air inlet.

8. The projection apparatus according to claim 1, wherein the partition has another second air inlet positioned close to the light source.

* * * * *